(12) United States Patent
Lyons

(10) Patent No.: US 9,874,890 B2
(45) Date of Patent: Jan. 23, 2018

(54) ELECTRICAL ENERGY CONSUMPTION DIAGNOSTIC DEVICE, SYSTEM AND METHOD

(71) Applicant: ECOCENTRIC ENERGY PTY LTD, Bentley, Western Australia (AU)

(72) Inventor: Paul Lyons, Bentley (AU)

(73) Assignee: ECOCENTRIC ENERGY PTY LTD, Bentley, Western (AU)

( * ) Notice: Subject to any disclaimer, the term of this patent is extended or adjusted under 35 U.S.C. 154(b) by 396 days.

(21) Appl. No.: 14/433,244

(22) PCT Filed: Oct. 4, 2013

(86) PCT No.: PCT/AU2013/001139
§ 371 (c)(1),
(2) Date: Apr. 2, 2015

(87) PCT Pub. No.: WO2014/053021
PCT Pub. Date: Apr. 10, 2014

(65) Prior Publication Data
US 2015/0234406 A1  Aug. 20, 2015

(30) Foreign Application Priority Data

Oct. 4, 2012 (AU) ................................ 2012904326

(51) Int. Cl.
*G05B 15/02* (2006.01)
*G05F 1/66* (2006.01)

(52) U.S. Cl.
CPC ............... *G05F 1/66* (2013.01); *G05B 15/02* (2013.01)

(58) Field of Classification Search
CPC .......... G05B 15/02; G05F 1/66; G01R 22/061
See application file for complete search history.

(56) References Cited

U.S. PATENT DOCUMENTS

2003/0076242 A1  4/2003 Burns et al.
2005/0068192 A1  3/2005 Rogai
(Continued)

FOREIGN PATENT DOCUMENTS

EP  1062648  6/2005

OTHER PUBLICATIONS

EPO examination report CF Form 1507, Application No. EP 13 84 4292.6, dated Jul. 3, 2016, pp. 1-10.
(Continued)

*Primary Examiner* — Bryan Bui
(74) *Attorney, Agent, or Firm* — Bond Schoeneck & King, PLLC; David L. Nocilly

(57) ABSTRACT

A portable electrical energy consumption diagnostic device 10 connects to electrical systems to acquire and analyze electrical data. The device has an onboard power supply 12, an energy monitoring means 14, a mini PC 16, a modem/router 18, CT adaptors 20 and an interface 22, all housed in a portable container 24, such as a hard case. The device 10 is connected to external electrical connector(s) (CT inputs) 26, 32 to temporarily connect the device to an electrical supply of electrical equipment. Electrical data acquisition means and an onboard electrical data processing means determine electrical consumption characteristics of monitored equipment over a period of time, such as lighting, air conditioning, elevators, pumps, motors etc. Optional transmission means transmits the acquired electrical data to a remote electrical data processor for remote electrical data processing. The onboard or remote data processor generating report data relating to the electrical energy consumption.

29 Claims, 9 Drawing Sheets

(56) References Cited

U.S. PATENT DOCUMENTS

2009/0312968 A1 12/2009 Phillips et al.
2011/0145611 A1 6/2011 Lee
2013/0054165 A1* 2/2013 Ramirez .............. G01R 22/061
　　　　　　　　　　　　　　　　　　　　　　　　　　702/62

OTHER PUBLICATIONS

Meter Test Ldt.: "Caltest 10 Portable Energy Meter Tester", Feb. 10, 2010, XP055255731, Retrieved from the Internet: URL:http://qqq.meter-test-equipment.com/download/pdf/en/Caltest10_en.pdf. Retrieved Mar. 7, 2016.
CN 101 436 326 A (Harbin Res Inst of Electrical [CN] (May 20, 2009).
International Search Report, Form PCT/ISA/2010, dated Dec. 9, 2013, pp. 1-5.

* cited by examiner

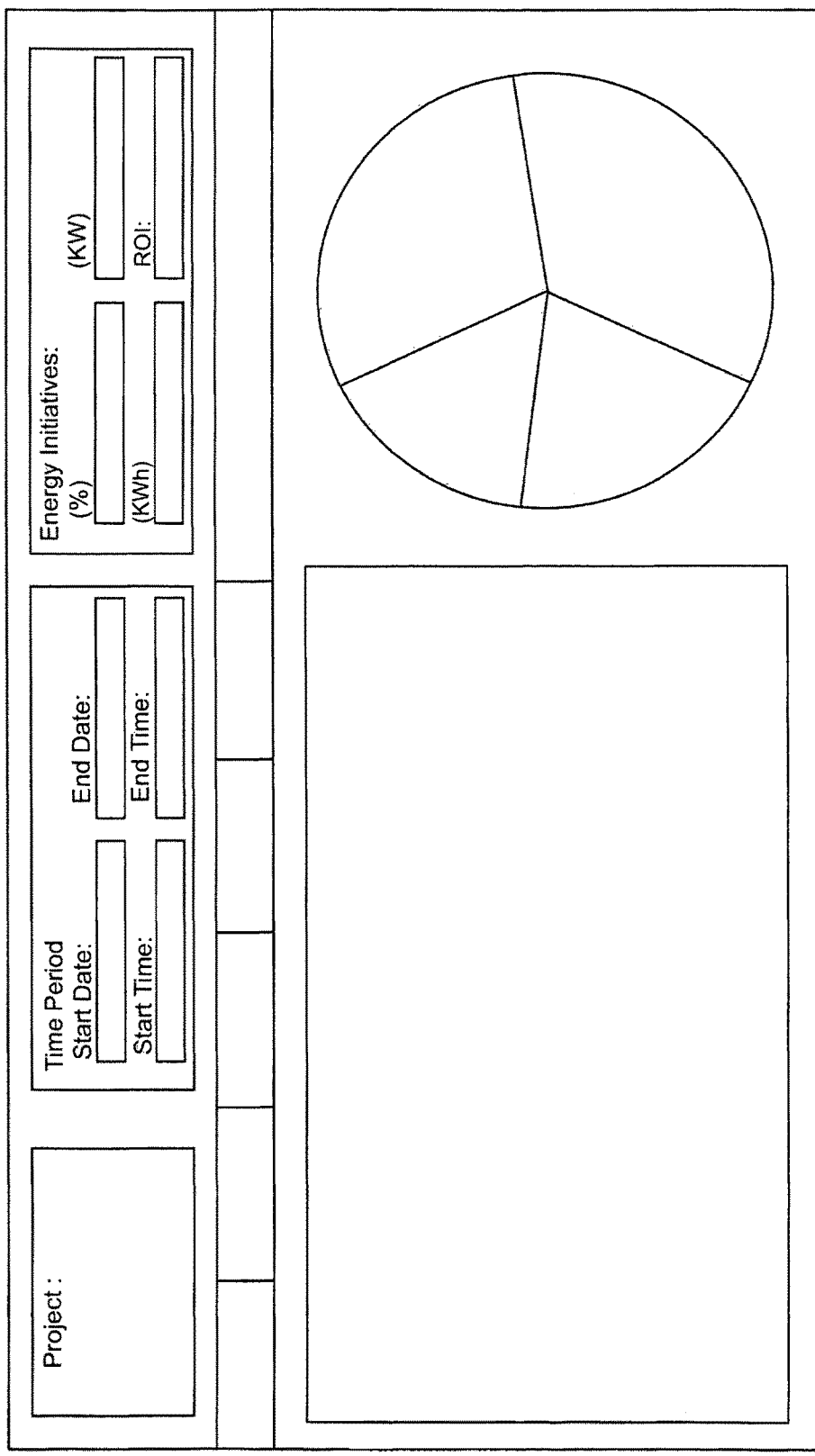

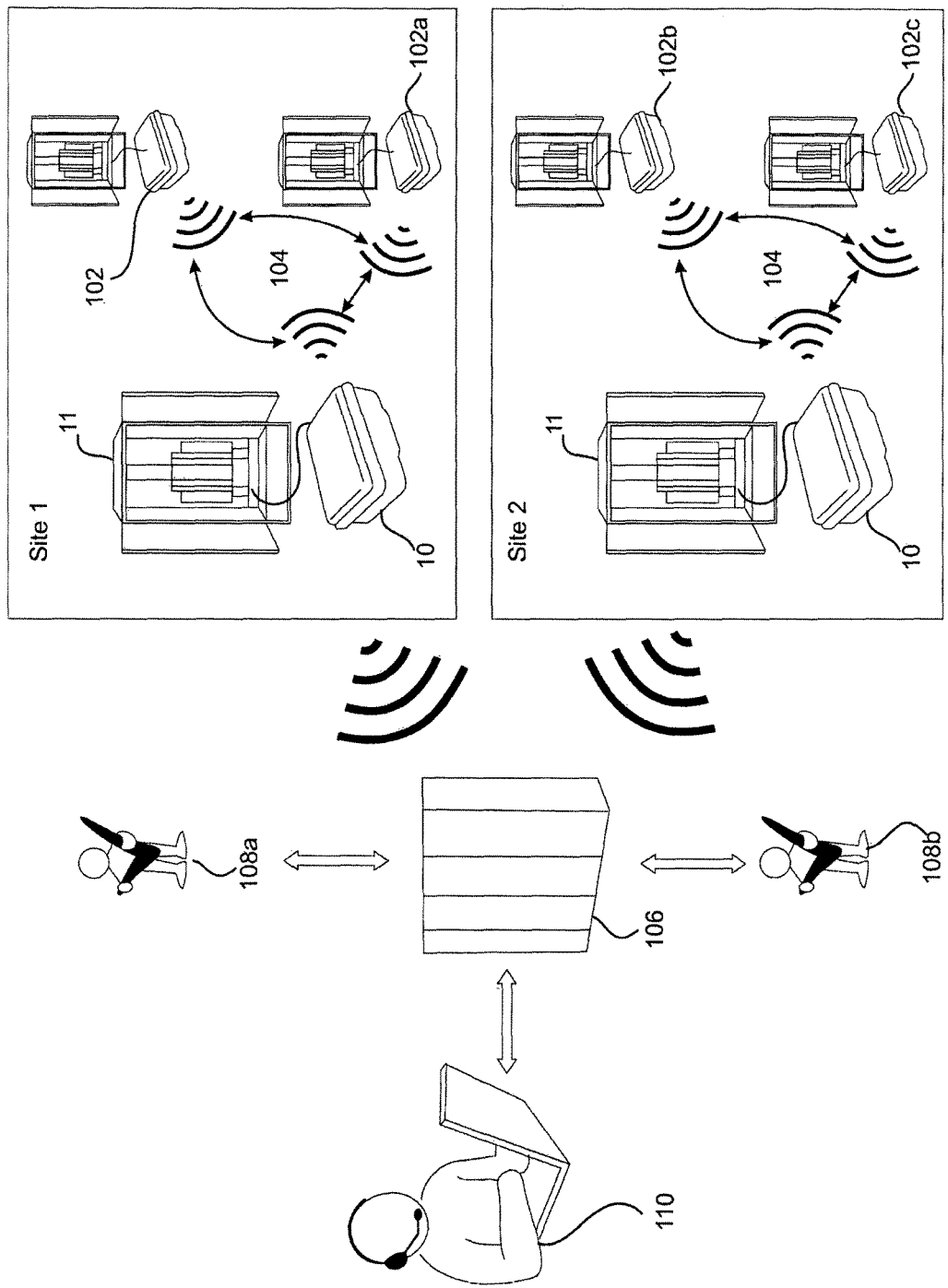

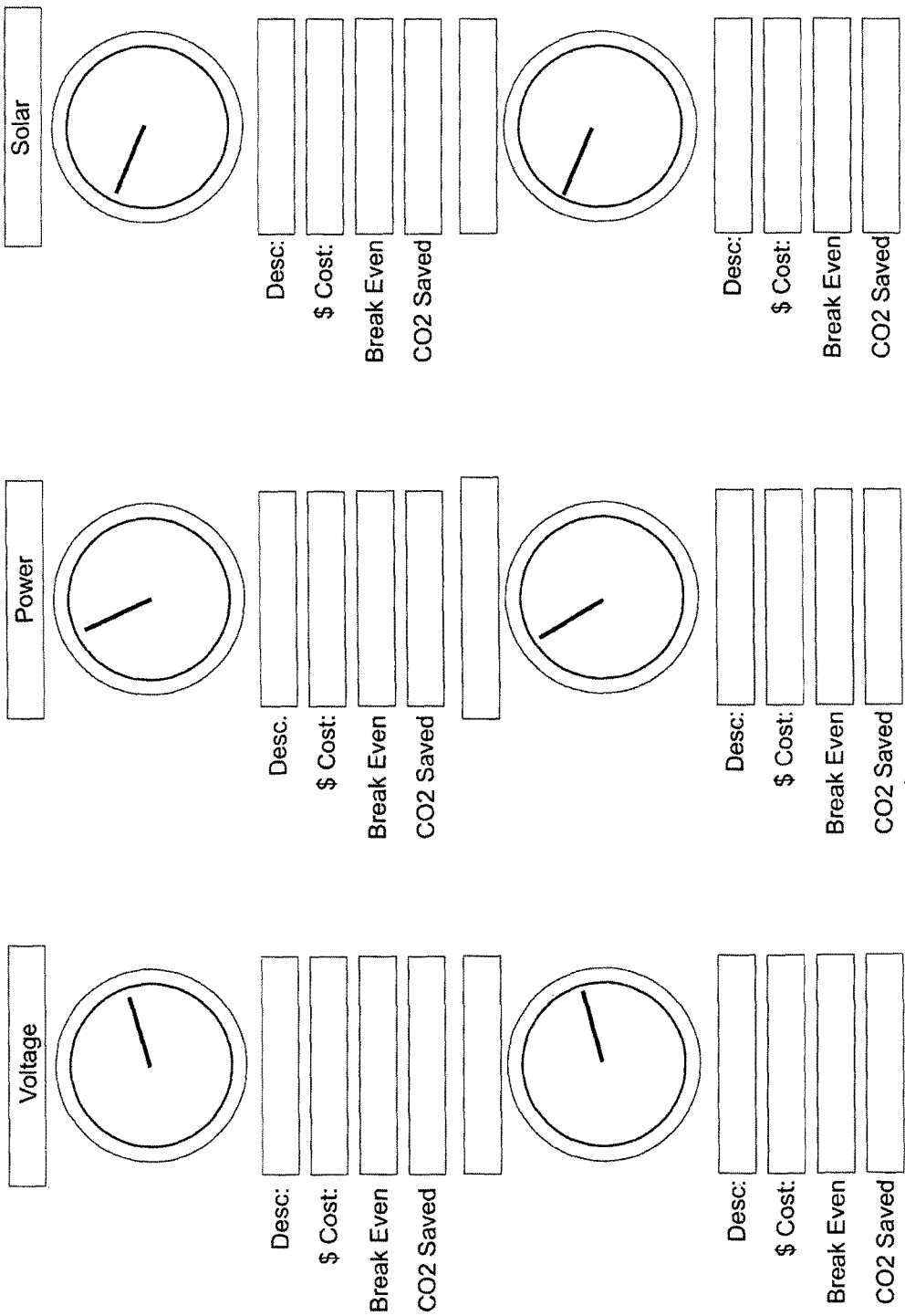

ELECTRICAL ENERGY CONSUMPTION DIAGNOSTIC DEVICE, SYSTEM AND METHOD

FIELD OF THE INVENTION

The present invention relates to monitoring, analysis and reporting of electrical energy consumption to diagnose electrical energy consumption or inefficiency.

BACKGROUND TO THE INVENTION

Electrical energy consumption and the financial cost associated therewith are of growing concern to many people, businesses, and in deed, countries as a whole. Wasted electrical energy not only costs the user more money than is necessary but also uses up valuable natural resources for energy generation or requires more renewable energy installations than is necessary.

Most buildings or installations using electricity have simple electricity meters to measure the amount of electricity consumed in order to calculate the cost of the electricity to be charged to the consumer. These meters can be monitored for the amount of energy used, and the periodic consumption figures tracked so that present electricity consumption can be compared to past electricity consumption. Such graphs are usually shown on electricity bills from the electricity provider, but do not aid in real time measurement of electricity consumption or what equipment or where in a building consumption may be excessive. Excessive consumption might be an indicator of failing electrical equipment or need to upgrade old equipment, or a need to balance consumption.

Energy audits can be carried out on a building or installation. Such audits are largely theoretical in nature, are complex and the volume of data to be assessed makes it difficult to disseminate. Persons conducting an energy audit can be disruptive to normal operations and personal within the building or at the installation. Fixed core current transformers (CTs) can be used to proportionally measure the amount of electricity being consumed. However, these are relatively large and expensive fixed installations, and an authorised electrical contractor is needed to access the associated electrical switchboards.

With the aforementioned problems in mind, it has been realised that it is desirable to provide a means and/or method for improved monitoring and reporting of electrical energy consumption.

SUMMARY OF THE INVENTION

In one aspect the present invention provides a portable electrical data diagnostic device connectable to electrical systems to acquire and analyse electrical data there from, the device including:
at least one electrical connector to temporarily connect to an electrical supply of electrical equipment;
  electrical data acquisition means; and
  electrical data processing means to determine electrical consumption over a period of time or transmission means to transmit the acquired electrical data to a remote electrical data processor for remote electrical data processing.

The acquired electrical data may be processed to diagnose electrical consumption issues and produce electrical consumption and/or cost related reports e.g. for the easy understanding by the non-technical reviewer.

Advantageously, the present invention provides a portable electrical consumption diagnostic device for energy efficiency analysis that is non-disruptive to operational activities of a business or a building/installation and which preferably provides automated analysis in real-time and an account of electrical energy consumption to make informed decisions, such as on capital expenditure and/or maintenance scheduling for electrical equipment.

The present invention is beneficial for use in energy audits because electrical data can be acquired in real time and reports on electrical consumption can be generated with very little delay.

Known building management systems (BMSs) at best gather and report on half hourly electrical energy consumption based on fixed data from an energy retailer for the whole building.

To the contrary, one or more embodiments of the present invention provide for real time continuous monitoring and reporting on electrical consumption for a required period of time.

Electrical data may be acquired and reported showing periodicity and/or increase in consumption for a whole building, a floor or section of the building, right down to particular pieces of equipment. Thus, at least one temporary electrical connector of the present invention may be connected into a switchboard of a building or installation at whole building/installation level, a sub-level covering a zone or portion of the building/installation, right down to the individual electrical supply to a particular piece of equipment.

The device of the present invention may include multiple said temporary electrical connectors for temporarily connecting to a variety of electrical supplies at a switchboard of a building or installation.

Preferably the present invention includes a power supply (e.g. a battery and/or connection to an external power supply), a modem-router, a data processor, and an electrical branch monitoring board for connection of the at least one temporary electrical connectors to the switchboard.

A memory device, such as a hard disc drive (HDD) or solid state (SS) memory may also be provided to store electrical data for analysis. These components may preferably be housed in a portable carry case.

External components may be connected to and form part of the device. These external components include portable current transformers (CTs), cabling, at least one temperature and/or at least one/humidity sensor, and at least one interface.

A further aspect of the present invention provides a method of analysing and reporting electrical data relating to electrical energy consumption of a building or installation, the method including: temporarily connecting a portable electrical energy diagnostic device to at least one electrical circuit of the building or installation, obtaining for a period of time electrical data relating to consumption of electrical energy through the at least one electrical circuit, analysing the obtained electrical data, and reporting on the electrical energy consumption based on the analysed electrical data.

The portable electrical energy diagnostic device may be temporarily connected to multiple said electrical circuits.

Prior to obtaining and analysing electrical data, the electrical energy diagnostic device may be set-up to obtain the electrical energy data by carrying out an initial device set up procedure, a references set up procedure, a branch circuits set up procedure and a communications set up procedure.

The initial set-up may occur when a new data acquisition, analysis and reporting task is created and reference information has been input into the device from which calculations and processing is conducted. Initial set-up data may include one or more of: project name, address, type of building(s)/installation(s), switchboard Number/Location, electrical tariff.

The reference set-up stage may include an electrical interfacing stage including a combination of manually entering information into the device and providing data sourced from at least one CT transducer connected to the electrical energy diagnostic device.

The reference set-up stage may provide a reference from which aggregated information from electrical circuit branch monitors must equate.

Manually entered data may include one or more of electrical supply name, size of feed in the electrical cables to be monitored, number of feed in cables or type of supply.

At least one of a temperature or humidity sensor may be connected to the electrical energy diagnostic device and temperature and/or humidity data acquired to be used in the analysis of the electrical energy consumption data.

Electrical 'branch' circuits set-up may include manually entering information into the diagnostic device and/or data collected from the current transformers (CTs). Manually entered the electrical data may include entering one or more of a circuit name, circuit location, circuit type and electrical phase.

An interface for CTs may be provided for connecting the diagnostic device to various electrical circuits in a switchboard.

The method may include ensuring that the diagnostic device is enabled locally and via remote connection to a remote server.

A signal may be provided that indicates electrical data is being received and the logic of this data is as expected or within one or more required parameters. The diagnostic device may be connected to the remote server if there are no faults indicated in the data or with the device.

Electrical data obtained when the diagnostic device is connected to the circuits in the switchboard may be transferred at intervals based on set-up parameters to a database stored within the diagnostic device or stored remotely. The database may be accessible locally and/or remotely via the processor whereby the electrical data is available for processing and being presented locally or synchronised with the remote server and processed and presented remotely.

BRIEF DESCRIPTION OF THE DRAWINGS

FIG. 9 shows a general layout of a report on electrical energy consumption after processing of the electrical data according to an embodiment of the present invention.

FIG. 10 shows a schematic representation of network architecture according to an embodiment of the present invention.

FIG. 11 shows a representation of display of information and recommendations to a user/client.

DESCRIPTION OF PREFERRED EMBODIMENT

Figure 1:
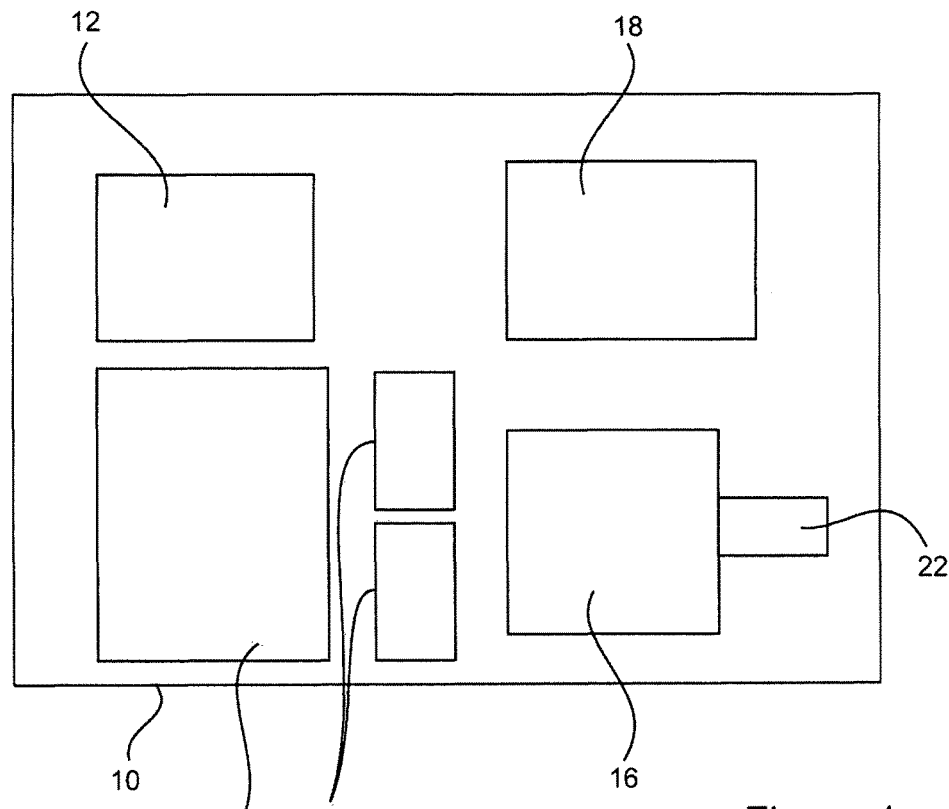
FIG. 1 shows a general view of the primary components within a portable device according to an embodiment of the present invention.

One or more embodiments of the present invention will hereinafter be described with reference to the accompanying figures.

A portable container, such as a hard briefcase style container, houses a power supply, a modem-router, a data processor (preferably a miniature data processor), and at least one energy transducer. Multi-purpose connection points are provided to the exterior of the case for input of at least one satellite connector module and other power, communication and voltage references as required.

Cables and Split-core Current Transformers (CTs) may be carried in the container or may be carried separately carried.

The device of the present invention is portable and efficient to connect to an electric switchboard. This provides a non-disruptive service to a client to which the electrical consumption analysis and reporting is to be provided. The device preferably provides automated reporting in that, once connected to the switchboard, the device is autonomous in the sense that it will automatically and continuously acquire electrical consumption data for the required period. The device may be controlled remotely to vary its reporting specification. The device may be securely accessed via the internet and the modem-router to obtain reports/data and to vary any parameters for acquiring and/or reporting data.

The diagnostic device may include provision for server back-up for security & technical assessment of installation. Having the diagnostic device connected to a central server provides multiple benefits to both an end user (in the sense of benefiting from the audit and reporting service from the device) and from operating a control centre:
  i) Any logged data is saved as a back up to the device
  ii) The device has access to periodical updates of firmware or software
  iii) A central control centre retain control in the event of unsolicited use of a device. This may be through use of a unique (preferably per diagnostic device) activation key/code that should preferably be kept current through periodic connectivity with the central server(s).
  iv) Collected data can be 'banked' or consolidated to create a comprehensive data base of multiple energy users for additional development and market knowledge
  v) Provision for alarm notifications to a customer or operator in the event of unusual or device responses The device may include software having a beneficial set-up wizard for new users.
  i) The wizard will have a feedback mechanism to the installer that reveals mistakes in the set up process. This may help avoid mistakes in the set up process. For new users or those unfamiliar with the set-up or the device, the feedback mechanism may also provide visual and textual instructions throughout the set up procedure.

ii) Final stage of the set up involves having to connect to the server before logging can begin Device Software Communication between device components is preferably via open-protocol MODBUS standard, preferably carried on two wires between branch monitor, temperature/humidity sensor and the data processor.

The data processor preferably uses a Linux-based operating system and an SQL-based database to store and process the recorded data. The data processor may also have a web-server to provide a portal on the local network to configure and manage the device.

Device Web-Based Portal

The device can be configured and managed via a local web-based portal accessible via a web browser on a portable computer, such as a laptop or tablet device, connected either directly to the device (Ethernet) or via the wireless router (Wifi). This portal includes: one or more of a set-up and configuration wizard, a live dashboard providing charts/tables, and a data analysis reporting and/or data export tool, such as via pdf, Word, Excel, CSV Central Server The central server preferably includes a Linux virtual PC with Apache, MySQL and Perl/PHP communicating securely via transport layer security (TLS) or secure sockets layer (SSL). This architecture is intended to scale with the volume of devices it is handling. However, the central server could instead be a Windows server, running IIS, SQL Server/Oracle and Java.

All devices when connected to the internet communicate with the central server for the following reasons:
Automatic Updates (preferably of all software on the device)
Synchronisation and Backup (of all data collected)
Remote Support, Diagnostics, Quality Assurance and Control
Data Consolidation (eg. for multiple device projects)
Online Internet Based Portal The central server's web-server provides a secure online portal for the device owner/operator, licensee and/or end user client to access services online regardless of the status of the respective device including:
A live dashboard providing accessible charts and tables detailing the electrical energy consumption in various formats, such as consumption versus time, individual equipment electrical consumption, building/installation zone electrical consumption, increase in consumption identifying possible failure of equipment to enable pre-emptive maintenance to be scheduled.
Reporting analysed data and/or exporting analysed or un-analysed data for remote reporting or remote analysis and reporting.
Report creator for creating a document visualisations and explaining the analysis results. This may include editable analysis and recommendations for energy efficiency improvements.
Remote Administration for remotely configuring and managing the device or multiple said devices.
Licensing, Booking and Accounts Management Set-Up Procedure There are four stages of the set-up procedure: 1. Initial Set-up, 2. References Set-up, 3. Branch Circuits Set-up, 4. Communications set-up.

1. Initial Set-Up

Initial set-up occurs when a new data acquisition, analysis and reporting task is created and all the common descriptive details are entered into the project. Initial set-up parameters are important at this stage to the overall processing of data initial set-up includes reference information from which calculations and processing is acquired. The data in this section includes: Project Name, Address, Type of Building(s)/Installation(s), Switchboard Number/Location, Tariff. Additional Information 2. References Set Up The reference set up stage is the first electrical interfacing stage where the NRGYZR hardware must be installed. It is therefore a combination of both manually entered information and data that is sourced from the CT transducer.

Manually entered data includes: Supply Name, Size of feed in the electrical cables to be monitored, Number of feed in cables, Type of Supply (If Applicable) i.e. HVAC, Lighting, etc.

Hardware Components:
Temperature and Humidity data is acquired through the transducer which provides the information via the open communication protocol known as MODBUS.
Reference Voltage is a connection that must be hard wired into an available circuit breaker in the applicable switchboard.
Main Current Transformers—come in different sizes and are governed by the size of the main incoming cables that they are measuring.

The information in this reference set-up stage serves as master reference(s) from which aggregated information from the branch monitors must equal. The architecture of the system is hierarchical in that these mains references sit at the top i) The Hierarchy structure may include that the parent (or master) CT value must be equal or greater than the sum of the lower CT values. This means that any deviation from this equation triggers a fault in the set up process. i.e. $CT(m) \geq CT(1)+CT(2)+ \ldots CT(n)$ 3. Branch Circuits Set-Up As with the references set-up, the branch monitors require both manually entered information and data collected from the current transformers.

Manually entered data includes: Circuit Name, Location, Type, Electrical Phase.

Hardware Components:
Interface Module. This is a 9-way enclosure that allows the installer to locate groups of CT's at various locations around the switchboard. The module preferably has a number (preferably 9) of 2.5 mm Socket Power Chassis connectors.
CT's. Each CT can be either 50 A or 100 A and is split core so that they can be attached without the need to disconnect the cable. Each CT has a 2.5 mm plug power chassis connector for connection into the associated module. Preferably the present invention utilises 36 Branch CT circuits, though capacity for 72 or 84 or more monitored branches can be provided by specifying the components of the device and providing suitable connections.

4. Communications Set Up

The purpose of this stage is to ensure that the device enabled both locally but also via remote connection to the central server. As such there is an enable signal that indicates logging has begun. This means that the database is receiving data and the logic of this data is within the expected range. Providing there are no alarms or false data indicators on the device, the device connects to the central server. Once this connection is made then the device set-up is complete and the device installer may secure the site and leave the device in operation. However, it is preferred that a final communications check is confirmed before leaving the installed device as connection to the server may be compromised by replacing covers etc.

There may be instances when it is impossible for the diagnostic device to connect to the central server (such as a remote or poor reception area or difficult location. In such instances, connection to the central server can be overridden and the diagnostic device will obtain, analyse and store data, or obtain and store raw data for post analysis.

Data Processing

Electrical data is transferred at intervals based on the set-up parameters, eg every second, via the processor (e.g. MiniPC) to an SQL-based database stored on a fixed hard disk within the device itself. This database can then be accessed both locally and remotely via the processor. The data can then be processed and presented locally or synchronised with the central server and processed and presented remotely. In both cases, identical algorithms and database structures are used to store and process the data.

Data processing is for two purposes: (1) the live web-based dashboard; (2) for the automated generation of reports and recommendations documents.

The live dashboard consists of several charts and/or tables presented via a web portal that show various trends and ratios split by multiple characteristics in regard to energy consumption.

The reports generator consists of a document template where charts, data tables and form fields are inserted in various sections to provide a complete report that can then be saved on to the user's computer and manually edited further if required.

The diagnostic device 10 as shown in general layout in FIG. 1 includes an onboard power supply 12, an energy monitoring board 14, a MiniPC 16, and modem/router 18 (preferably 3G/4G/GPS capable), CT adaptors 20 and an interface module 22, all housed within a portable container 24. Typically the portable container is an impact resistant carry case (such as a carry case of plastic or metal, or combinations thereof).

Figure 2:
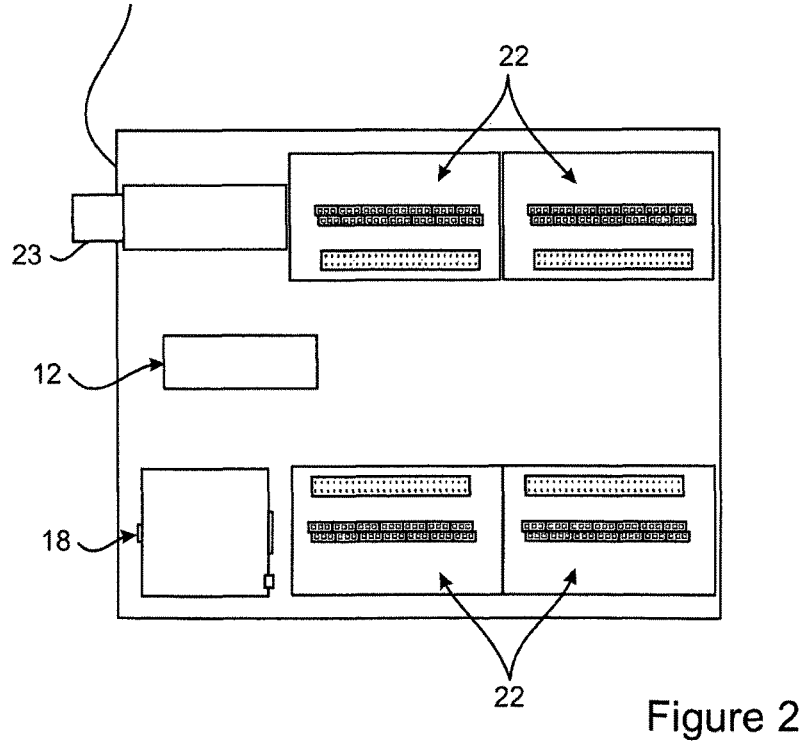
FIG. 2 shows an alternative arrangement of the primary components within a portable device according to a further embodiment of the present invention.

The embodiment shown in FIG. 2 has a different arrangement of components. However, functionality is similar as for the embodiment in FIG. 1. The diagnostic device 10 includes an onboard power supply 12, multiple interface modules 22 to interface the CT adaptors with the processing and other components within the device. A 3G/4G/GPS compatible modem 18 is provided, as is external connection to external data exchange via a connector 23 e.g. to convert an RS232 connector to an RS485 connection.

Figure 3:
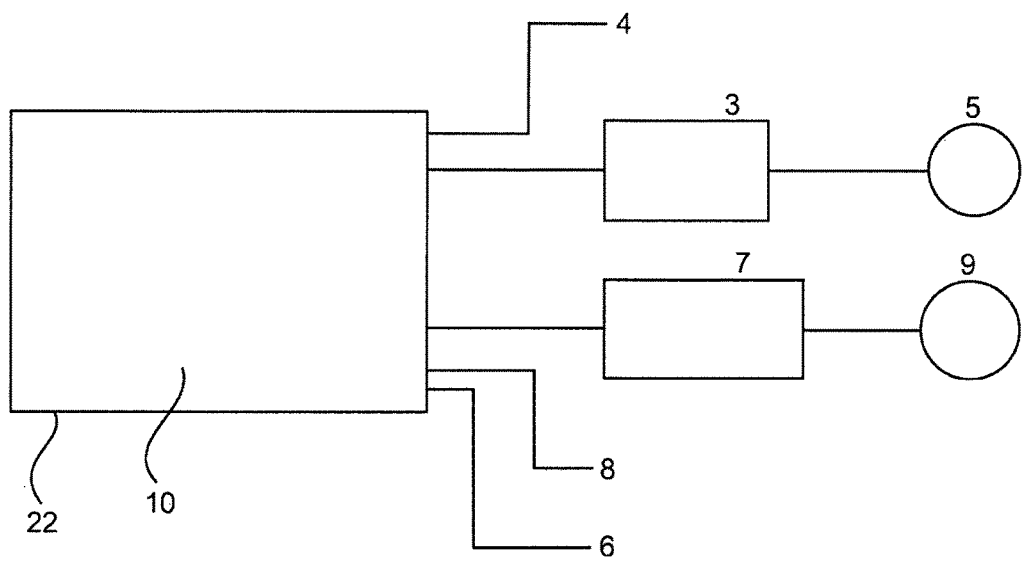
FIG. 3 shows a general topology of connectivity of a device according to an embodiment of the present invention.

FIG. 3 shows a main device 2 which incorporates therein the main components described above within the diagnostic device 10 with reference to FIGS. 1 and 2. The device is connected to an antenna 4 and a LAN connection 6 to facilitate data transfer or exchange. Connection is provided for 3 phase & neutral reference voltage 8. Also, Branch CT interface modules 3 (8 off) are connected to Branch CT connectors 5 (9 off per Branch Interface Module, providing 72 available CT connections). Two main CT amplifier modules 7 are connected to "Rogowski Coils" 9 (4 off per Amplifier module).

Figure 4:
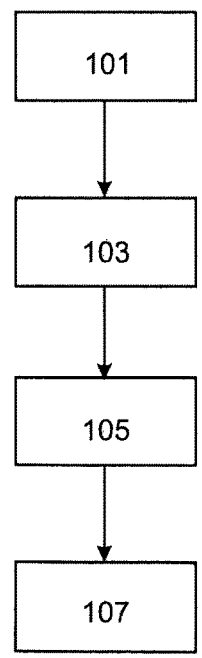
FIG. 4 shows a general diagrammatic flow of installation and use of the device to collect and report on data according to a further embodiment of the present invention.

FIG. 4 shows a general diagrammatic flow chart of installation and use of the device to obtain and report on data. As shown at 101, the device is installed to a switchboard by an authorised operative, where up to 80 unbalanced circuits or 240 balanced circuits are monitored, and circuit designation is configured. A step of data transmission 103 transmits acquired data, and data can be uploaded to a remote server via a wireless network, such as 3G. The transmitted data is captured, stored and managed 105. At this step, global data can be collated, and automated or manually selected recommendations made based on an automatic or manual assessment of the data characteristics. At step 107, an energy report is provided to the customer/client, with prioritised actions and solutions, thereby providing useful energy data to help reduce energy wastage, such as reporting on KWh consumption, percentage (%) energy use, CO2 emissions, revenue ($) and return on investment (ROI) for capital expenditure on machinery.

Figure 5:
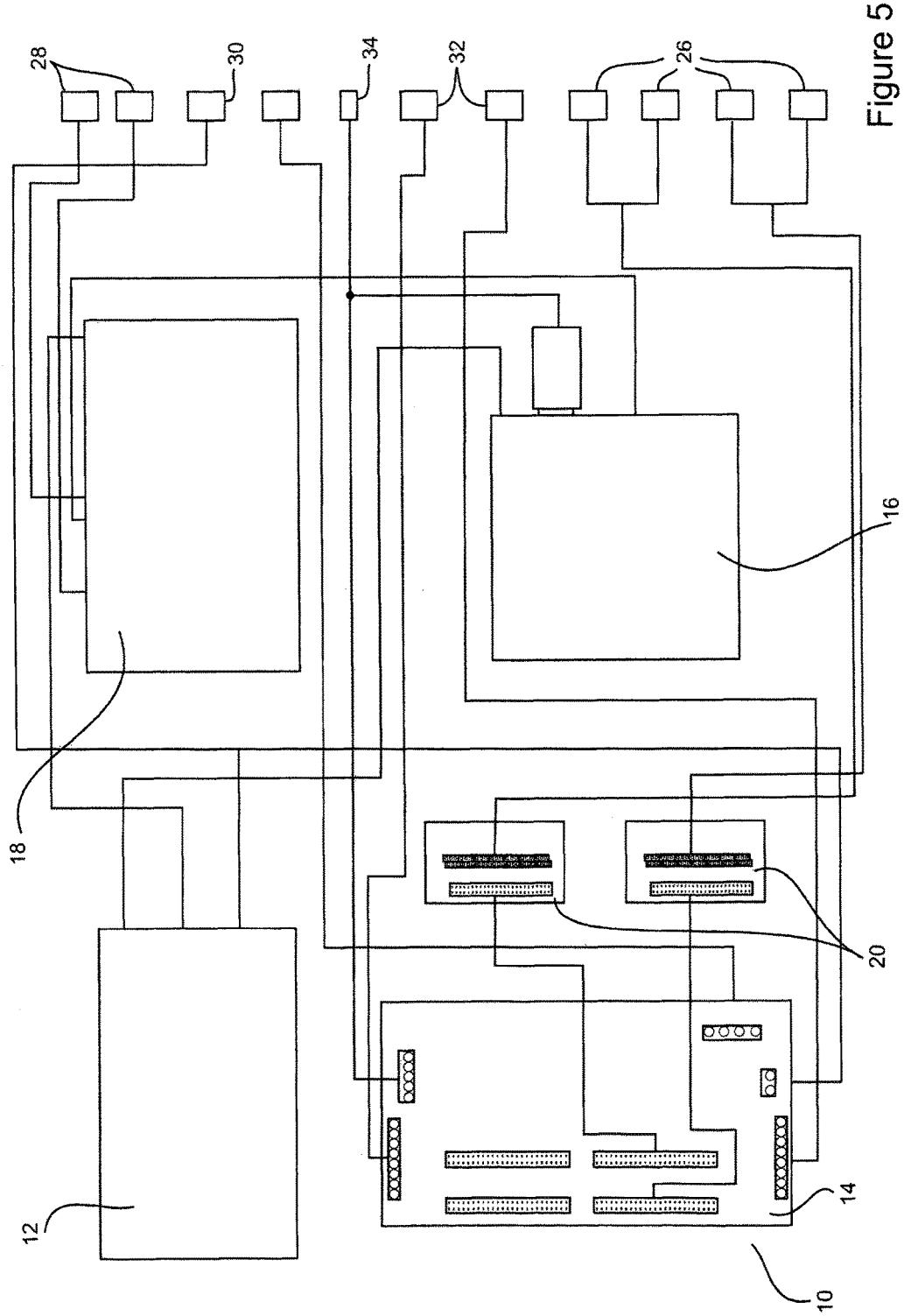
FIG. 5 shows a more detailed layout of components and connectivity in the diagnostic device than in FIG. 1 according to an embodiment of the present invention.

FIG. 5 shows connectivity between the components within the device 10. FIG. 2 also shows connection for external components, such as CT inputs 26 and mains CT inputs 32, as well as connections for Ethernet LAN and USB 3G dongle 28, and for the temperature and/or humidity sensor(s) 34.

Figure 6:
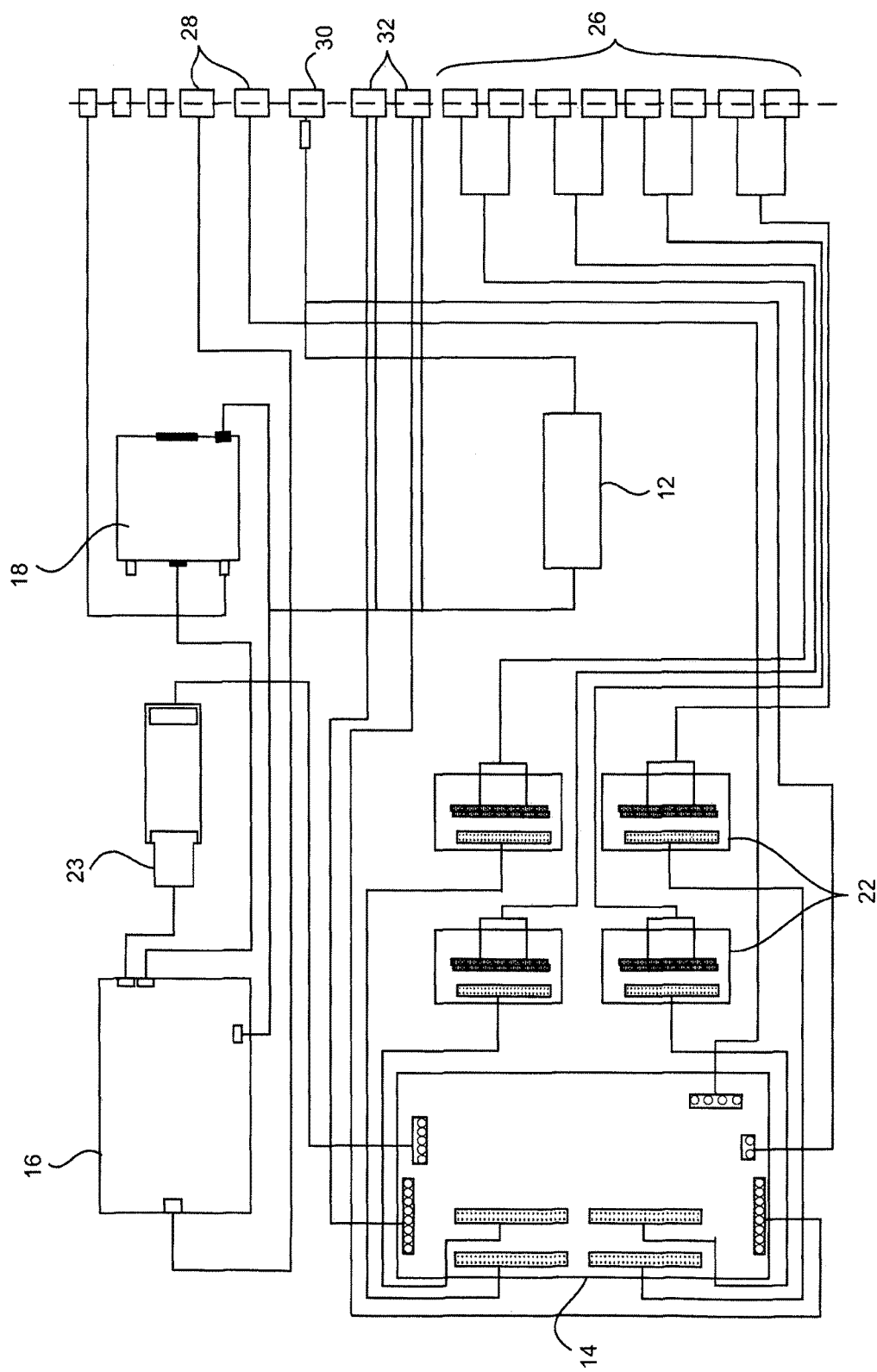
FIG. 6 shows an alternative detailed layout of components and connectivity in the diagnostic device according to an embodiment of the present invention.

FIG. 6 shows an alternative arrangement and connectivity of the components compared to FIG. 5.

Figure 7:
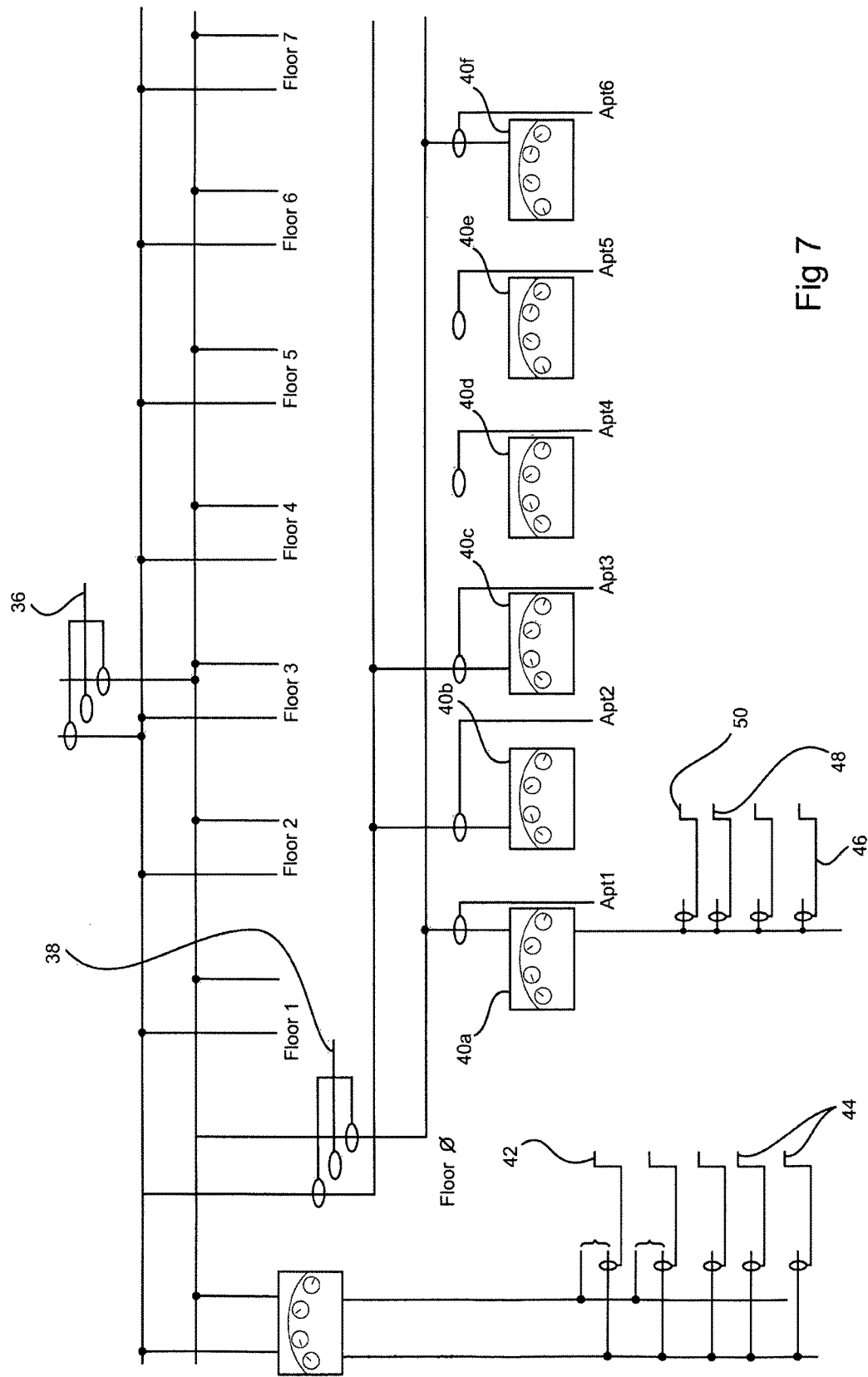
FIG. 7 shows a diagrammatic depiction of the connectivity of a portable device to a building power switchboard according to an embodiment of the present invention.

FIG. 7 shows connection of various CTs to various respective electrical circuits of a switchboard. The switchboard contains the circuit breakers for the various floors and pieces of equipment in a building or installation.

Mains 1 36 and Mains 2 38 provide three phase CT connection to monitor the three phase mains inputs, being mains 1 main Feeder and Mains 2 Ground Floor Feeder. CT connections are made to the various rooms 40a to 40f on a floor, and to various pieces of equipment, such as an elevator 42, lighting 44 etc. Within a room, such as an apartment, individual equipment can be monitored, such as room lighting 46, air conditioning 48 and a cooking stove/oven 50. The CT leads of the diagnostic device connect to the various electrical circuits for all of these rooms, floors and equipment.

Figure 8:
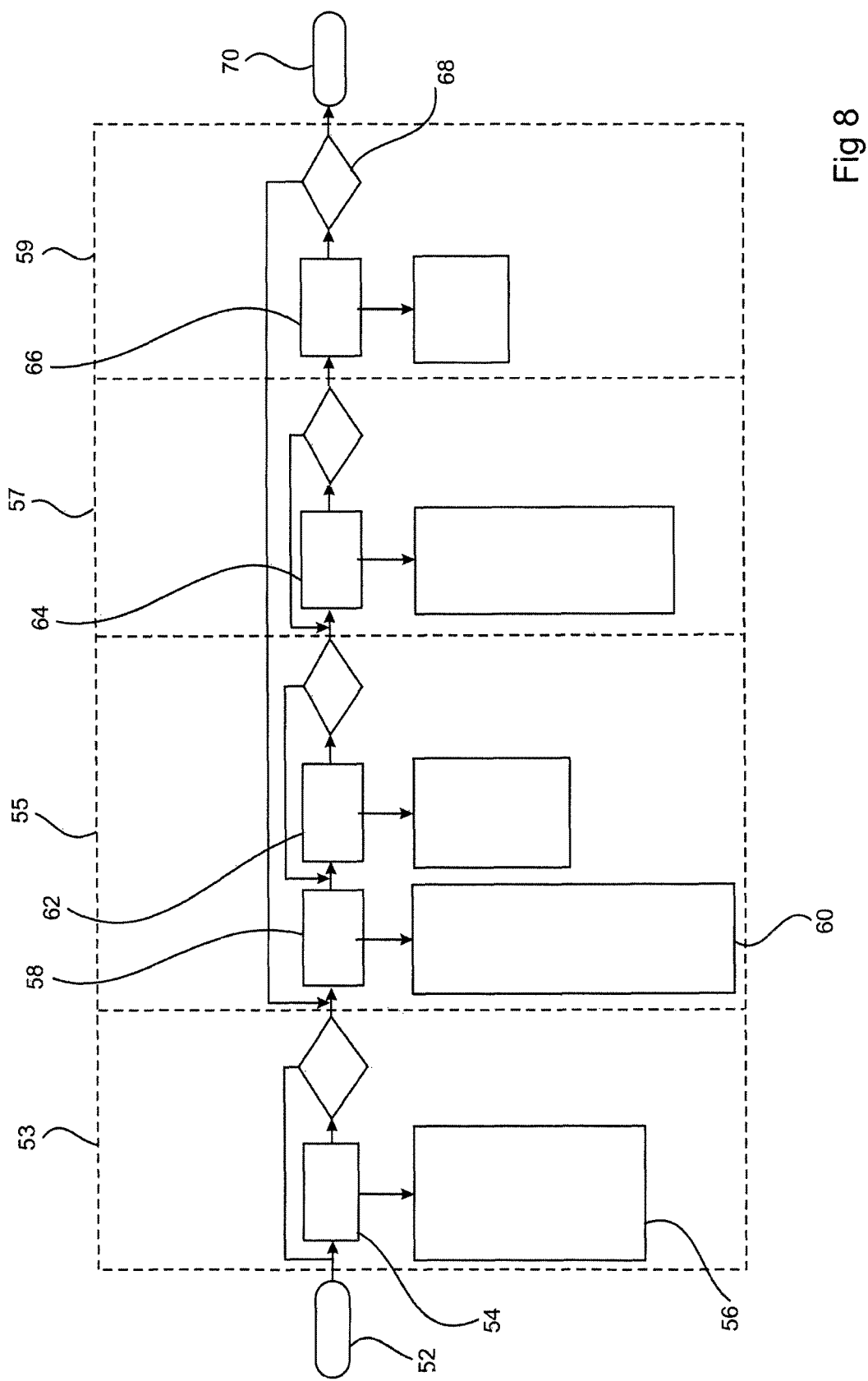
FIG. 8 shows a flow chart of the set-up stages for an embodiment of the present invention.

FIG. 8 shows a flow chart of setting up the diagnostic device. The device 10 is first switched (powered up) 52. Project information 54 is then entered at an initial set-up phase 53. Project information includes a set-up wizard 56 to guide a user how to make the necessary connections and set-up procedure. Project information includes location, address, project name, job details (type of switchboard), number of connections, type of building or installation). Once initial set-up is completed, the device enters a References set-up phase 55. Reference cables are connected 58. including connecting an environmental sensor (such as temperature and/or humidity) 60. The Master CTs are connected 62 to the mains cables.

Once the master CTs as references are connected and reference set-up is complete, set-up then proceeds to a Branch circuits set-up phase 57. CTs are connected 64 to the branch circuits. Once the branch circuits are connected, set-up of the device proceeds to a communications set-up 59 phase. The device then communicates 66 with a remote server. Once an enabled signal is received 68, set-up is complete 70.

FIG. 9 depicts an embodiment of a proposed 'live' dashboard during or after the data acquisition. This function is effectively the tool with which a technical reviewer is able to input various energy change scenarios for the site in order to arrive at an optimum outcome for the site. It is therefore an intermediary stage where final analysis is conducted and then from this point a final report is able to be printed with the proposed recommendations.

Data analysis can be presented with a detailed report showing total amount of energy consumed, periods of energy consumption, changes in energy consumption (including sharp or gradual increase in consumption—suggesting maintenance or care may be required, or a device is in too warm or cold a location). Energy consumption can be shown relating to current and/or voltage.

FIG. 10 shows a general schematic representation of network architecture embodying the present invention. This shows the network architecture at site level and at server level via a GSM platform to enable the obtained electrical data to be assessed remotely and reported upon.

Electrical data is gathered by a portable electrical energy consumption diagnostic device 10 at a site (say, S1). Further such devices 10a can be deployed at other sites (say, S2, for example). Each such device is electrically connected into a respective electrical switchboard 100, 100a. One or more slave portable electrical energy consumption diagnostic devices 102,102a, 102b, 102c . . . can be connected to other switchboards at the same respective sites or other sites and communicate with a respective master device 10. Communication between master and slave devices is preferably wireless communication via a micro-network 104.

Each master device 100 communicates wirelessly electrical data obtained via the switchboard 11 to a remote data collection server 106.

Authorised auditors 108a, 108b . . . , can review and report on obtained electrical data by connecting to the server. One or more technicians 110 can maintain data and data integrity, as well as monitor for and deal with technical issues that may arise from time to time.

FIG. 11 shows a representation of a display 'dashboard' 112. This provides an interface for a user to appreciate and evaluate the energy, cost and $CO_2$ saved through energy monitoring and control enabled through the present invention. The values shown in FIG. 7 are exemplary for the purposes of understanding the nature and benefit of the present invention.

The invention claimed is:

1. An electrical energy consumption analysis and reporting system that includes a portable electrical energy consumption diagnostic device connectable to electrical systems to acquire and analyse electrical data relating to electrical equipment connected to at least one electrical system, the device comprising:

multiple current transformer (CT) electrical connectors, at least one of said current transformer electrical connectors connecting the device to a mains electrical supply to an electrical switchboard, and at least one other of the current transformer electrical connectors connecting to a branch electrical circuit of at least one branch electrical circuit at the electrical switchboard of the at least one electrical system connected to at least one item of the electrical equipment;

the device further including data acquisition means to acquire electrical data from electrical equipment connected to the branch electrical circuit; and an on-board data processing means to process the acquired electrical data, the data processing means arranged and configured to determine electrical consumption over a period of time while the electrical current transformer electrical connectors are connected, and/or the device including transmission means to transmit the acquired electrical data to a remote data processor, for remote data processing of the electrical data, the on-board or remote data processor generating report data relating to the electrical energy consumption of the electrical equipment.

2. The system of claim 1, wherein the acquired electrical data is processed by the on-board or remote data processing means to produce electrical consumption and/or cost related reports.

3. The system of claim 1, providing energy efficiency analysis through automated analysis in real-time and generating an account of electrical energy consumption.

4. The system of claim 1, providing real time continuous monitoring and reporting on electrical consumption for a required period of time.

5. The system of claim 1, wherein electrical data is acquired and analysed and the data processing means determines periodicity and/or increase in electrical energy consumption for a whole building or installation, a floor or section of the building or installation and/or particular pieces of equipment.

6. The system of claim 1, wherein the at least one of the current transformer electrical connectors is removably connectable into the switchboard of a building or installation at whole building/installation level, a sub-level covering a zone or portion of the building/installation and/or an individual electrical supply to a particular piece of equipment.

7. The system of claim 6, including multiple said current transformer electrical connectors removably connectable into the switchboard for removably connecting the device to a variety of electrical supplies at the switchboard of the building or installation.

8. The system of claim 1, including on-board components including a power supply, modem-router, data processor, and an electrical branch monitoring board for connection of the at least one of the current transformer electrical connectors to the switchboard.

9. The system of claim 8, the on-board components further including a memory device to store the acquired electrical data for analysis.

10. The system of claim 8, including a housing in the form of a portable case containing the onboard components.

11. The system of claim 1, including external components connected to and form part of the device.

12. The system of claim 11, the external components including at least one portable current transformer (CT), cabling, at least one temperature and/or at least one/humidity sensor.

13. A method of analysing and reporting electrical data relating to electrical energy consumption of electrical equipment connected to at least one electrical system of a building or installation, the method comprising:

connecting at least one current transformer electrical connector of a portable electrical energy diagnostic device to a mains electrical supply into a switchboard and connecting at least one other current transformer electrical connector to a branch electrical circuit of at least one branch electrical circuit at the switchboard for at least one electrical circuit for the electrical equipment connected to at least one electrical system of the building or installation, obtaining for a period of time, while the electrical current transformer electrical connectors are connected, electrical data relating to consumption of electrical energy of the connected electrical equipment through the at least one electrical circuit, analysing the obtained electrical data, and reporting on the electrical energy consumption based on the analysed electrical data.

14. The method of claim 13, whereby the portable electrical energy diagnostic device is connected to multiple said electrical circuits.

15. The method of claim 13, whereby, prior to obtaining and analysing electrical data, the electrical energy diagnostic device is set up to obtain the electrical data by carry out an initial device set up procedure, a reference set up procedure, a branch circuits set up procedure and a communications set up procedure.

16. The method of claim 15, whereby the initial set-up occurs when a new data acquisition, analysis and reporting task is created and reference information has been input into the device from which calculations and processing is conducted.

17. The method of claim 16, whereby the initial set-up data includes one or more of: project name, address, type of building(s)/installation(s), switchboard Number/Location, electrical tariff.

18. The method of claim 15, whereby the reference setup stage includes an electrical interfacing stage including a combination of manually entering information into the device and providing data sourced from at least one said current transformer electrical connector connected to the electrical energy diagnostic device.

19. The method of claim 18, whereby the manually entered data includes one or more of electrical supply name, size of feed in the electrical cables to be monitored, number of feed in cables or type of supply.

20. The method of claim 15, whereby the reference set-up stage provides a reference to which aggregated said electrical data acquired from a plurality of electrical circuit branch monitors must equate.

21. The method of claim 15, including providing an interface for multiple said current transformer electrical connectors connecting to various electrical circuits in a switchboard.

22. The method of claim 15, including transferring the obtained electrical data at intervals based on set-up parameters to a database stored within the diagnostic device.

23. The method of claim 22, whereby the database is accessible locally and remotely via the processor whereby the electrical data is available for processing and being presented locally or synchronised with the remote server and processed and presented remotely.

24. The method of claim 13, including connecting to the electrical energy diagnostic device at least one of a temperature or humidity sensor and acquiring temperature and/or humidity data to be used in the analysis of the electrical energy consumption data.

25. The method of claim 13, including both manually entering information into the diagnostic device and data collected from the current transformers electrical connector.

26. The method of claim 25, whereby the manually entered data includes one or more of a circuit name, circuit location, circuit type and electrical phase.

27. The method of claim 13, including ensuring that the diagnostic device is enabled locally and via remote connection to a remote server.

28. The method of claim 27, including providing a signal that indicates the electrical data is being received and the logic of this data is as expected.

29. The method of claim 28, including connecting to the remote server if there are no faults indicated.

* * * * *